US006985987B2

(12) United States Patent (10) Patent No.: US 6,985,987 B2
Chang et al. (45) Date of Patent: Jan. 10, 2006

(54) APPARATUS AND METHOD FOR SUPPORTING MULTI-PROCESSORS AND MOTHERBOARD OF THE SAME

(75) Inventors: Nai-Shung Chang, Taipei Hsien (TW); Chia-Hsing Yu, Taipei Hsien (TW)

(73) Assignee: VIA Technologies, Inc., Taipei Hsien (TW)

( * ) Notice: Subject to any disclaimer, the term of this patent is extended or adjusted under 35 U.S.C. 154(b) by 524 days.

(21) Appl. No.: 10/036,168

(22) Filed: Oct. 22, 2001

(65) Prior Publication Data

US 2002/0099925 A1 Jul. 25, 2002

Related U.S. Application Data

(60) Provisional application No. 60/248,371, filed on Nov. 14, 2000, provisional application No. 60/244,982, filed on Nov. 1, 2000.

(30) Foreign Application Priority Data

May 2, 2001 (TW) ............................... 90110526 A

(51) Int. Cl.
*G06F 13/00* (2006.01)
(52) U.S. Cl. ...................................... 710/300; 710/16
(58) Field of Classification Search ................ 710/105, 710/315, 300–304, 8, 11, 15, 16
See application file for complete search history.

(56) References Cited

U.S. PATENT DOCUMENTS

| | | | | |
|---|---|---|---|---|
| 4,967,346 A | * | 10/1990 | Freidin | 710/305 |
| 5,408,611 A | * | 4/1995 | Kim | 712/229 |
| 5,644,760 A | * | 7/1997 | Polzin et al. | 713/500 |
| 5,714,873 A | * | 2/1998 | Hwang | 323/273 |
| 5,758,108 A | * | 5/1998 | Nakamura | 710/307 |
| 5,761,479 A | * | 6/1998 | Huang et al. | 710/301 |
| 5,819,050 A | * | 10/1998 | Boehling et al. | 710/104 |
| 5,848,250 A | * | 12/1998 | Smith et al. | 710/300 |
| 5,884,091 A | * | 3/1999 | Ghori et al. | 712/32 |
| 5,931,930 A | * | 8/1999 | Krick et al. | 710/100 |
| 6,327,663 B2 | * | 12/2001 | Isaac et al. | 713/300 |
| 6,381,693 B2 | * | 4/2002 | Fish et al. | 713/1 |
| 6,401,157 B1 | * | 6/2002 | Nguyen et al. | 710/302 |
| 6,529,967 B1 | * | 3/2003 | Robertson | 710/16 |
| 6,671,814 B1 | * | 12/2003 | Kubo et al. | 710/100 |
| 6,691,235 B1 | * | 2/2004 | Garcia et al. | 713/300 |

FOREIGN PATENT DOCUMENTS

EP 535539 A1 * 4/1993
JP 05204844 A * 8/1993

* cited by examiner

Primary Examiner—Khanh Dang
Assistant Examiner—Trisha Vu
(74) Attorney, Agent, or Firm—J.C. Patents

(57) ABSTRACT

An apparatus and a method for supporting multi-processors and a motherboard using the same are provided. The apparatus receives the pins Z36 and AK36 of the Socket-370 central processing unit to determine which type the Socket-370 central processing unit is. According to the suspend status input signal transmitted from the south bridge of the motherboard, the determined result is latched, and some appropriate circuits are coupled to the Socket-370 central processing unit via a switch circuit. Meanwhile, the suspend status input signal is delayed and used to cut off the connection between the Socket-370 central processing unit and the apparatus. The delayed suspend status input signal is further delayed and then sent to an ATX power supply to activate the whole system.

17 Claims, 6 Drawing Sheets

APPARATUS AND METHOD FOR SUPPORTING MULTI-PROCESSORS AND MOTHERBOARD OF THE SAME

CROSS REFERENCE TO RELATED APPLICATION

This application claims the priority benefit of U.S. provisional application Ser. No. 60/244,982, filed on Nov. 1, 2000; 60/248,371, filed on Nov. 14, 2000 and Taiwan application serial no. 90110526, filed on May 2, 2001.

BACKGROUND OF THE INVENTION

1. Field of the Invention

The invention relates in general to a computer system for supporting multi-processes. More particularly, the invention relates to an apparatus and a method for supporting multi-processors and distinguishing the type of the central processing unit.

2. Description of the Related Art

The motherboard manufactures have to design a specific motherboard for each types of central processing unit (CPU). This is because the CPU socket, the pin function, the system clock frequency and the supplied voltage for each CPU are different. Therefore, a common mother cannot be used. Even when different kinds of CPU's use the same CPU socket, the functions given by each pin, the system clocks and the supplied voltages are different, so that a common motherboard cannot be applied.

In U.S. Pat. No. 5714873, a method to automatically supply correct voltage to the CPU is provided. The VOLDET pin of the CPU is used to transmit a signal to a selector, so as to control the voltage regulator to output a proper voltage to the CPU. However, this is only suitable for the application of a CPU with the VOLDET The conventional CPU's, the Coppermine and Tualatin type, fabricated by the CPU manufacture Intel associates with 370 pins socket, so called Socket-370 CPU Between two types of CPU, there are 23 pins with different functions (referring to Table 1). The core voltage and supply voltage used for these two CPU's are different (Coppermine type followed VRM8.4, and Tualatin type followed VRM8.5 VCC_CORE specification for core voltage, as well as, Coppermine type supplied 1.5 V, Tualatin type supplied 1.2 V for supply voltage). Therefore, these two types of CPU cannot service at a common motherboard.

TABLE 1

| Pin | Coppermine | Tualatin |
|---|---|---|
| E21 | RSVD | RSVD |
| E27 | SLEWCTRL | VSS |
| G37 | RSVD | VTT |
| N37 | RSVD | NCHCTRL[VTT] |
| Q33 | RSVD | RSVD[NCHCTRL] |
| W35 | RSVD | RSVD[VTT] |
| X2 | BR#1 | RSVD |
| X4 | RESET2# | VSS |
| X34 | VCC | VTT |
| Y33 | CLKREF | CLK# |
| Z36 | V_2.5 | RSVD |
| AB36 | V_COMS | VTT |
| AD36 | V_1.5 | VTT |
| AE37 | FLUSH# | FLUSH# |
| AG1 | RSVD | VTT |
| AH4 | RSVD | RESET# |
| AJ3 | VSS | RSVD(RESET#) |
| AK4 | VSS | VTT_PWRGD |

TABLE 1-continued

| Pin | Coppermine | Tualatin |
|---|---|---|
| AK22 | GTLREF7 | CMOSREF |
| AK36 | VSS | VID25MV |
| AL1 | VSS | RSVD |
| AM2 | RSVD | VSS |
| AN3 | VSS | DYN_OD(BUSEL) |

SUMMARY OF THE INVENTION

The invention provides a distinguish device to distinguish the type of CPU, an apparatus and a method for supporting multi-processors motherboard A single motherboard supporting two types of CPU is provided to replace the scheme that requires two different motherboards for supporting each. Thus, the user can select different types of CPU to setup, the material management for the production manufactures is easier, and the cost is reduced.

The apparatus for supporting multi-processors comprises at least a distinguish device coupled to a first connecting pin of a CPU socket. Therefore, after inserting different types of CPU into the CPU socket, a first or a second equivalent resistance is produced at the first connecting pin to bring a CPU type select signal. A switch circuit is coupled to the distinguish device and the CPU socket for switching control, resulted in connecting a first type CPU signal to the pin of the first type CPU socket or a second type CPU signal to the connecting pin of the second type CPU according to the CPU type select signal.

The method for supporting multi-processors comprises the following steps. By inserting a first or a second type CPU socket, a first or a second equivalent resistance is produced at a first connecting pin of the CPU socket. A CPU type select signal is generated according to the difference between the first equivalent resistance and the second equivalent resistance. According to the CPU type select signal, a plurality of first type CPU signals is connected to the corresponding connecting pins of the CPU socket. Or alternatively, a plurality of second type CPU signals is connected to the corresponding connecting pins of the CPU socket.

Both the foregoing general description and the following detailed description are exemplary and explanatory only and are not restrictive of the invention, as claimed.

DESCRIPTION OF THE PREFERRED EMBODIMENTS

To provide a signal motherboard that support two CPU's, the motherboard has to decode the type of CPU before the system is activated. The decoded result provides correct circuit and signal, core voltage and the supply voltage after the system is activated to maintain a normal operation in the future.

Figure 1:
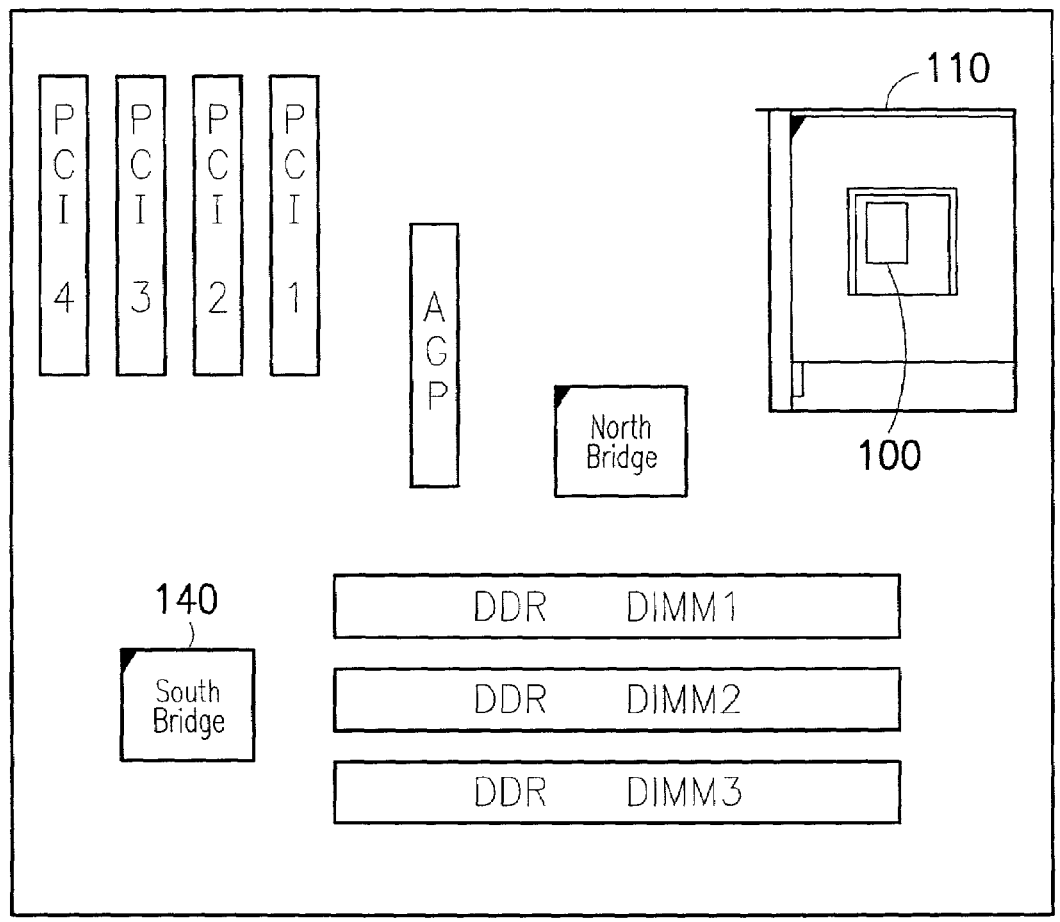
FIG. 1 shows the device allocation of a motherboard that support multi-processors.

FIG. 1 shows a device allocation of a motherboard for supporting multi-processors such as Socket-370 CPU's. The relative position of the apparatus and the CPU's on the motherboard is illustrated. In FIG. 1, considering the signal quality and other factors, the apparatus 100 is located very close to the position of the CPU socket 110, or even at an internal cavity of the CPU socket 110 to shorten the distance between the apparatus 100 and the CPU.

In this embodiment, the apparatus 100 comprises a processor select circuit, an interval control circuit and a switch circuit. The processor select circuit and the interval control circuit together form a distinguish device. According to the pin Z36 or AK36 of the Socket-370 CPU, the processor select circuit determines the type of the Socket-370 CPU is Coppermine and Tualatin. The processor select circuit outputs a CPU type select signal to the switch circuit. The CPU type select signal is latched by the switch circuit. According to the value of the CPU type select signal, an internal switch transistor connects a proper external circuit to the relative pin of the Socket-370 CPU (Coppermine or Tualatin type). A suspend status input signal transmitted from the south bridge 140 through the interval control signal is delayed with a predetermined stop determination time to cut off the connection between the pins Z36, AK36 of the CPU and the apparatus 100. Thus, these two pins are not affected by the processor select circuit during normal system operation. In addition, after the delayed suspended input signal is further delayed, it would be sent to an ATX power supply for switching on the whole system.

Figure 2:
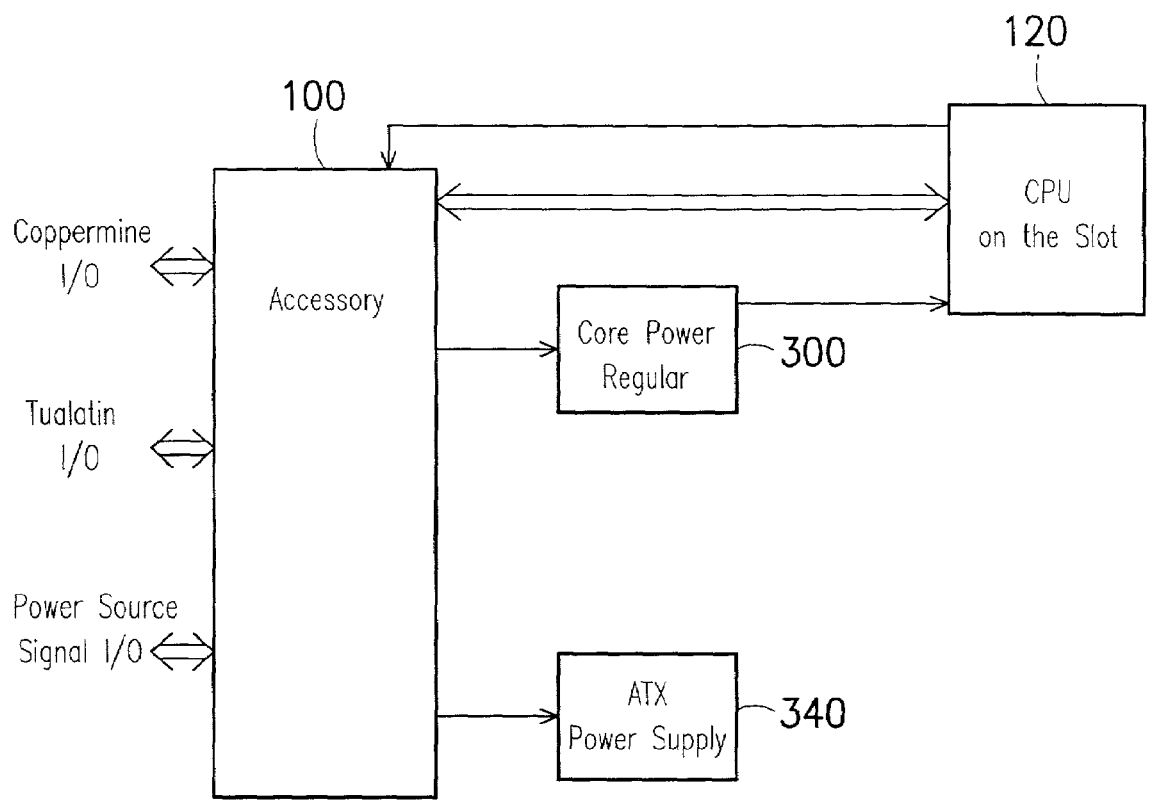
FIG. 2 is a block diagram showing an embodiment of a motherboard system that supports multi-processors according to the invention.

FIG. 2 shows a block diagram of a supporting multi-processors motherboard system. The apparatus 100 receives the suspend status input signal transmitted from the south bridge, the system clock and the required supplied voltage in addition to the connection with certain pins of the Socket-370 CPU 120 The output of the apparatus 100, that is, the CPU type select signal (C or T OUT), does not only switches the connection between the proper external circuit and the Socket-370 CPU, but also connects the I/O (Coppermine type I/O) to the corresponding signal pin of the Socket-370 CPU 120. The CPU type select signal is also transmitted to the VRM8.4 and VRM8.5 CPU core power regulator and the ATX power supply 340 for providing the core power and the supplied power to the CPU 120, so as to activate the whole system.

According to the embodiment of the invention, the apparatus uses the pins Z36 and AK36 of the Socket-370 CPU to determine the type of the Socket-370 CPU. After the system is activated, in the Coppermine type CPU, the pin Z36 is used for power source (VCC2.5), and the pin AK36 is used for grounded (VSS). It is different from the Tualatin type CPU. In Tualatin type CPU, the pin Z36 is reserved, while the pin AK36 is used for the power source (VID25MV). However, before the system is activated, it is known from measurement that the when Coppermine type CPU is inserted on the motherboard, the resistance for these two pins is Z36 (very large, larger than 100K) and AK36 (approaching zero). In contrary, when the Tualatin type CPU is inserted on the motherboard, the resistance of these two pins is Z36 (20–100) and AK36 (20–100). The processor select circuit in the apparatus 100 can use the property of having different resistance values at the same pin to distinguish which type the Socket-370 CPU is before the system is activated.

Figure 3:
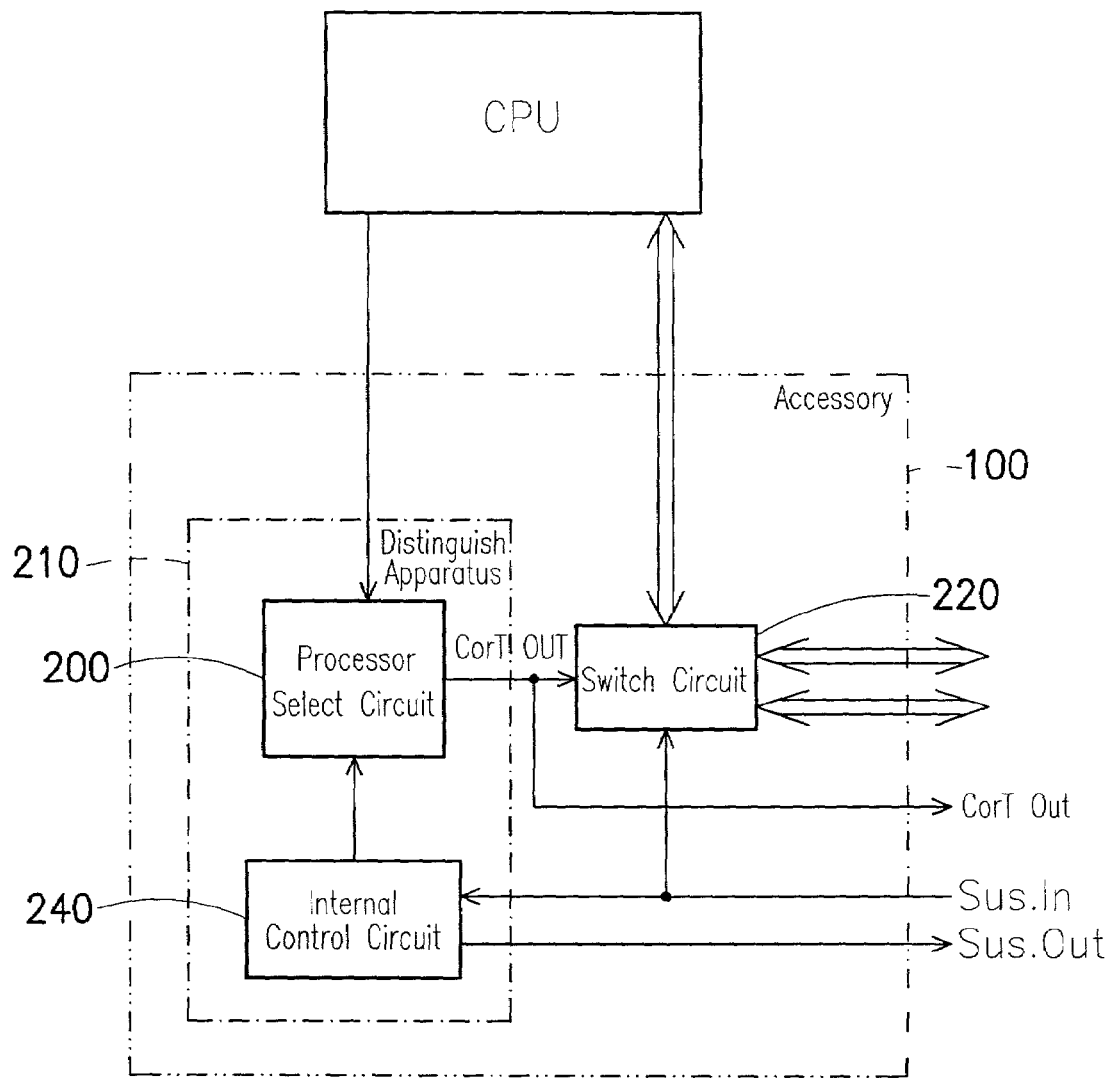
FIG. 3 is a block diagram showing the internal of the apparatus that support multi-processors to use a common motherboard.

FIG. 3 shows a block diagram of the internal of the apparatus that support multi-processors to process in a single motherboard. The apparatus 100 comprises a distinguish device 210 and a switch circuit 220. The distinguish device comprises a processor select circuit 200 and an interval control circuit 240. The processor select circuit 200 is connected to the pins AZ36 and AK36 of the Socket-370 CPU 120 to detect which type the Socket-370 CPU 120 is, so as to generate a CPU type select signal (C or T OUT). The switch circuit 220 uses the suspend status input signal (SUS.In) as the latch enable signal for all the internal latches. Therefore, the output CPU type select signal (C or T OUT) output from the processor select circuit 200 is latched The latched CPU type select signal is used to select some proper circuits (Coppermine or Tualatin type I/O) to connect with some pins of the Socket-370 CPU. The interval control circuit 240 also receives the suspend status input signal and delays it to generate a suspend status output signal transmitted to the ATX power supply. In addition, the interval control circuit 240 also delays the suspend status input signal to generate a cutoff activate signal, transmitted to the processor select circuit 200, so as to cut off the connection between the processor select circuit 200 and the pins Z36 and AK36 of the Socket-370. It thus ensures that the pins Z36 and AK36 are not affected by the processor select circuit 200 in normal operation of the system.

Referring to FIG. 2 and FIG. 3, the apparatus 100 receives the pins (Z36 and AK36) of the Socket-370 CPU 120 (Coppermine or Tualatin type), the required supplied powers (such as VTT, VSS) and some necessary signals (such as suspend status input signal). According to the type of the CPU, the switch circuit 220 connects proper circuits to the Socket-370 CPU 120. Meanwhile, the apparatus 100 also generates a CPU type select signal to inform the core power regulator 300 of VRM8.4 and VRM8.5 CPU which type of CPU is in use. The core power regulator 300 of the CPU can thus generate a proper core voltage to the Socket-370 CPU 120. In addition, the suspend status input signal received and delayed by the apparatus 100 is also converted as a suspend status output signal transmitted to the ATX power supply 340 to activate the system after verifying the type of CPU.

Figure 4:
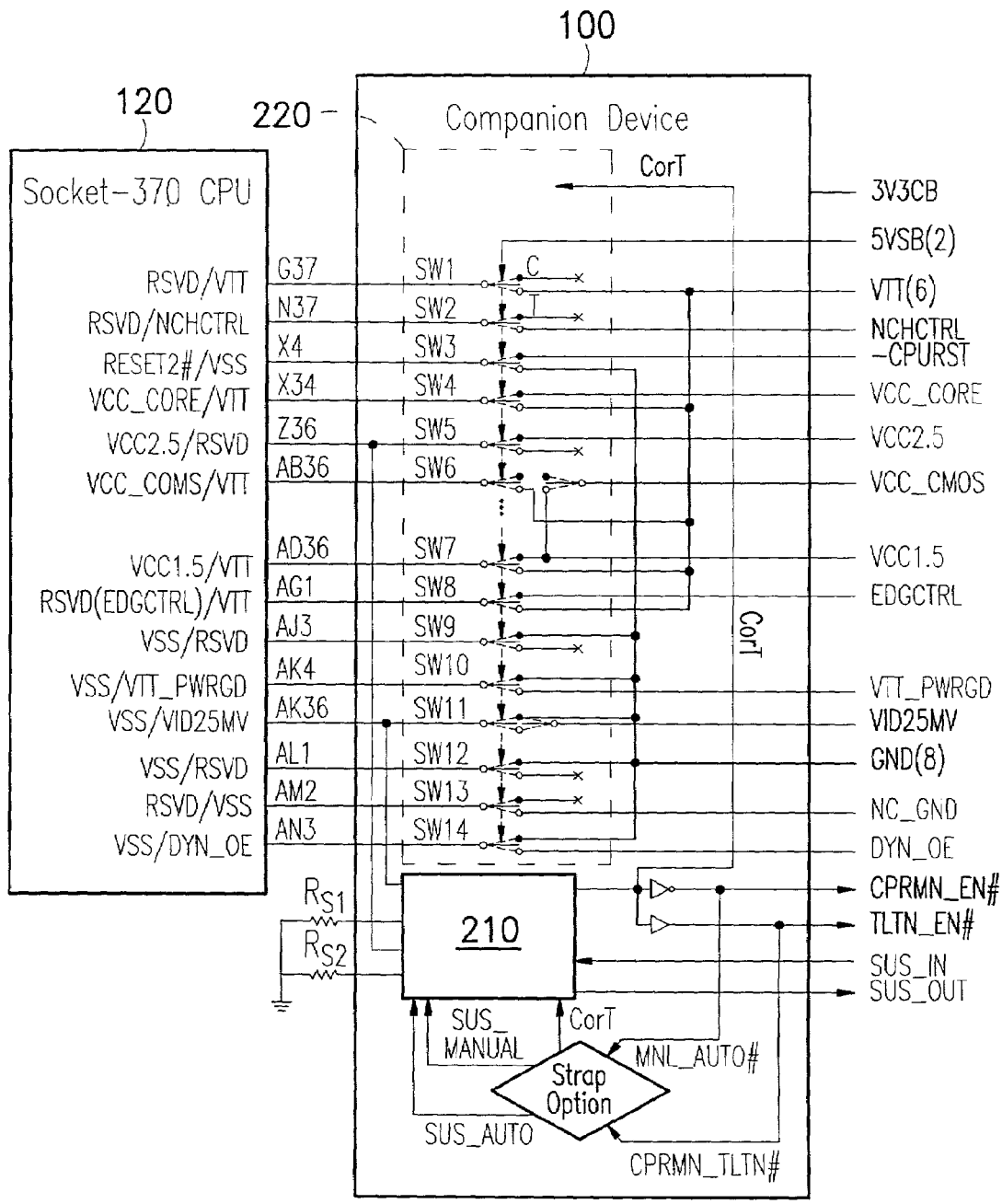
FIG. 4 is a schematic drawing showing the relationship between the switch circuit and the apparatus.

FIG. 4 shows the schematic drawing of the relationship between the switch circuit and the apparatus in the embodiment of the invention. The switch circuit 220 connects a proper signal (Coppermine or Tualatin type I/O) to the relative pins of the Socket-370 CPU 120 according to the CPU type select signal (C or T OUT).

Figure 5:
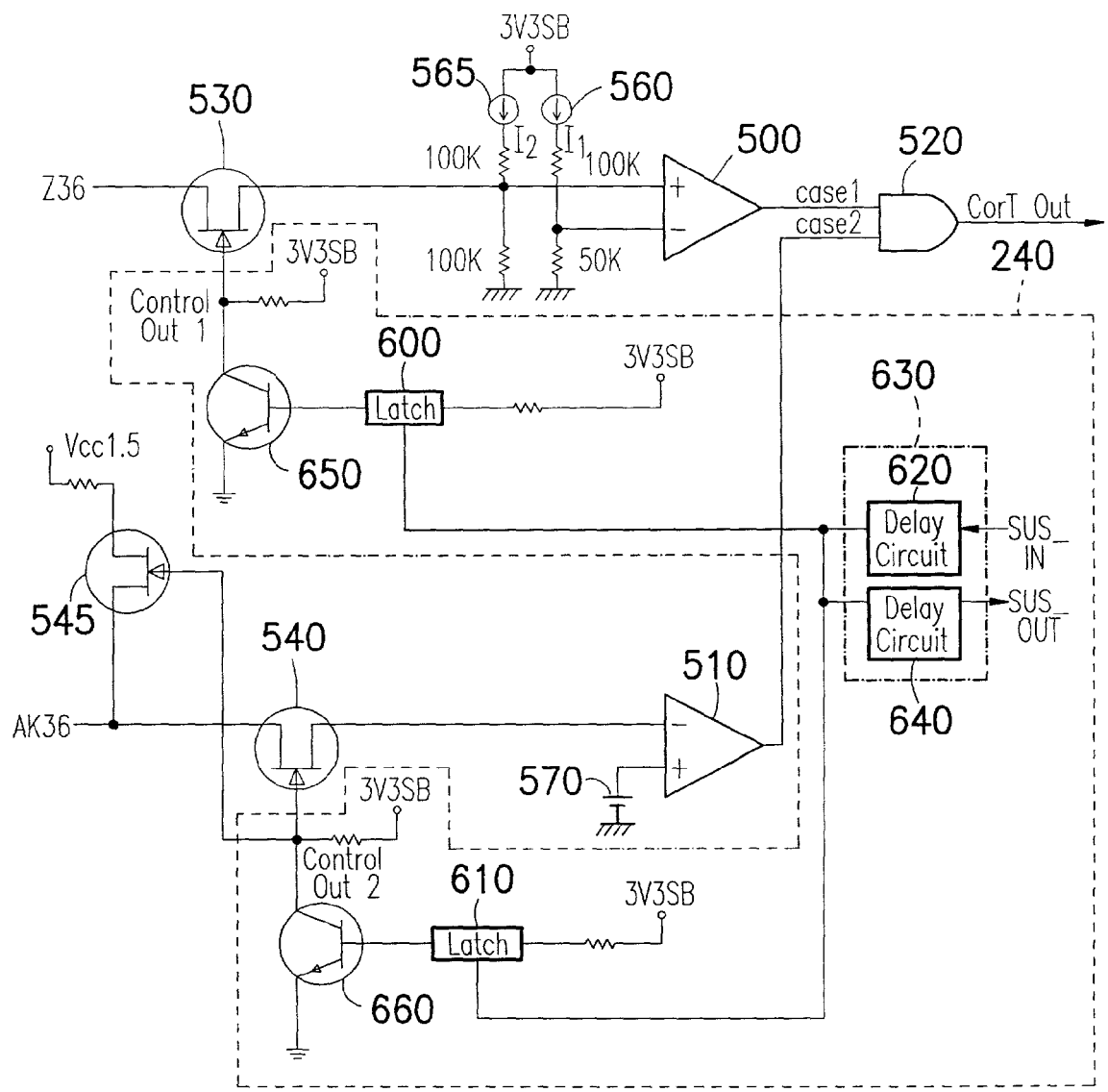
FIG. 5 shows the internal circuit of the distinguish device in one kind of CPU.

FIG. 5 shows an internal circuit of the distinguish device of a CPU type according to the invention. It comprises two major parts; a processor select circuit and an interval control circuit. The processor select circuit comprises two differential amplifiers (or operation amplifiers) 500 and 510, transistors 530, 540 and 545, constant current sources 560 and 565, and an AND gate 520. The constant current sources 560 and 565 are designed with an equal output current. The positive input terminal of the differential amplifier 500 is connected to the constant current source 565, and further to ground via a 100K resistor. The positive input terminal of the differential amplifier 500 is further connected to the pin Z36 of the Socket-370 CPU 120. The negative input terminal of the differential amplifier is connected to the constant current source 560 via a 100K resistor and to the ground (or other fixed potential) via a 50K resistor. The output of the differential amplifier 500 is a first type signal. On the other hand, the positive input terminal of the differential amplifier 510 is connected to a fixed power source, while the negative input terminal thereof is connected to the pin AK36 of the CPU 120 via a transistor 540. The pin AK36 of the Socket-730 CPU 120 is connected to another power source VCC1.5 via a transistor 545 and a proper resistor. The output of the differential amplifier 510 is a second type signal. The first and second type signals output a CPU type select signal via a logic circuit (AND gate 520).

Before the system is activated and the Coppermine type CPU is inserted on the motherboard, the resistance of these two pins is Z36 (far larger than 100K) and AK360 (approaching 0), respectively. In contrast, when the Tualatin type CPU is inserted on the motherboard, the resistance of these two pins is Z36 (20–100) and AK36 (20–100), respectively The difference between the resistance values is the reference to determine the type of CPU. In FIG. 5, when the Socket-370 CPU 120 is Coppermine type, the outputs of the differential amplifiers 500 and 510 (first and second types of signals) are both at logic High. Thus, the output of the AND gate 520 is also logic High to indicate that the currently used CPU is Coppermine type. In contrast, when the Socket-370 CPU 120 is Tualatin type, the outputs of the differential amplifiers 500 and 510 (the first and second types of signals) are both at a low logic state. Consequently, the output of the AND gate 520 (the CPU type select signal) is also logic Low to indicate the currently used CPU is Tualatin type.

It is well known that the arrangement of the positive and negative input terminals of the differential amplifiers 500 and 510 causes the first and second type signals to be logic High, and it indicates that the Socket-370 CPU 120 is Coppermine type. Similarly, other arrangement can be applied to indicate that the Socket-370 CPU 120 as Coppermine type when both the first and the second type signals are logic Low. Using the AND gate 520 to process the first and the second type signals to output the CPU type select signal is not the only choice. Furthermore, the CPU type select signal generated after the first and the second select signals processed by the AND gate is used to determined the type of the CPU However, in the invention, either one of the first and the second type signals can also be used as the CPU type select signal directly.

The interval control circuit comprises two latches 600 and 610, a delay device 630 and two transistors 650 and 66. After being delayed with a predetermined stop determination time by the delay circuits 620 and 640 of the delay device 630, the suspend status input signal is transmitted to the latches 600 and 610 as the latch activate signals. The latch activate signal is latched into a voltage value from low to high, so as to activate the transistors 650 and 660. The activated transistors 650 and 660 pull down the potentials of the nodes ControlOut1 and ControlOut2. These two control signals are used to turn off the transistors 530 and 540. Therefore, after obtaining the type of the Socket-370 CPU by the processor select circuit 200, the connection between the pins Z36, AK36 and the processor select circuit 200 is cut off. The suspend status input signal just through the delayed circuit 620 (the cutoff activating signal) is further delayed by the delay circuit 640 to become a suspend status output signal output to the ATX power supply 340 The whole system is then activated.

Figure 6:
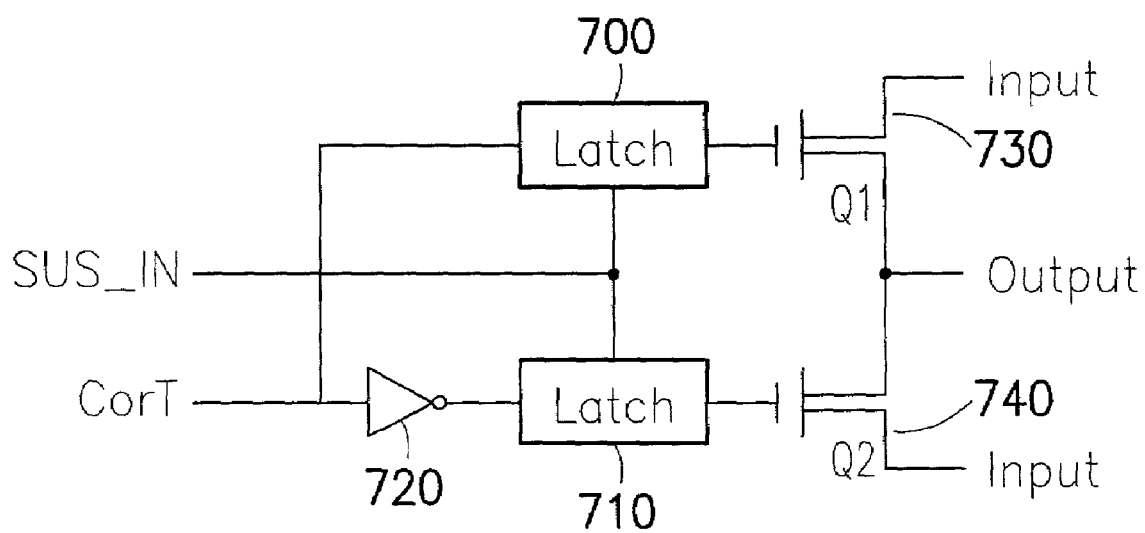
FIG. 6 schematically shows the internal circuit of the switch circuit

FIG. 6 illustrates the internal circuit of the switch circuit. The switch circuit comprises a plurality of latches (such as latches 700 and 710), a plurality of transistors (such as 730 and 740) and a plurality of inverters (such as Not gate 720).

The CPU type select signal (C or T OUT) output from the processor select circuit 200 and its complementary signal latches the suspend status input signal into the latches 700 and 710. The outputs of the latches 700 and 710 are used to activate or turn off the transistors 730 and 740. When the Coppermine type CPU is used, C or T signal is logic High, so that the transistors 730 and 740 are turned off. That is, the signal required by the Coppermine type CPU is selected as the output to connect to the Socket-370 CPU On the contrary, if the CPU is Tualatin type, C or T signal is logic Low, so that the transistor 730 is off, and the transistor 740 is on. That is, the required signal of the Tualatin type CPU is selected as the output to connect to the Socket-370 CPU The embodiment provides a backup power source 3V3SB. The backup power source is used as the power source of the processor select circuit or the interval control circuit of the distinguish device. Therefore, the system can provide normal power supply to correctly determine the type of the CPU.

It is appreciated that people of ordinary skill in the art determine the type of CPU inserted in the CPU socket only after the suspend status input signal is enabled Thus, the advantage of power saving can be obtained without the worry of changing the CPU in the midway. In the actual circuit, the above processor select circuit may further comprise an activate determination control circuit (not shown). After the activate determination control circuit receives the suspend status input signal, the processor select circuit starts operating to determine which type the CPU in the CPU socket is The activate determination control circuit controls the activation of the processor select circuit by applying the control of the above backup power source to a part of the internal circuit, such as a constant current source, in the processor select circuit.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. An apparatus for supporting multi-processors, wherein said apparatus is coupled to a central processing unit (CPU) socket, having a plurality of connecting pins, and when said CPU socket is inserted with a first type CPU, a first equivalent resistance is measured through a first pin among said connecting pins, and when said CPU socket is inserted with a second type CPU, a second equivalent resistance is measured through said first pin, wherein the first equivalent resistance is not equal to the second equivalent resistance, said apparatus comprising:
   a distinguish device, coupled to said first pin to use difference between said first and said second equivalent resistances to generate a CPU select signal; and
   a switch circuit, coupled to said distinguish device and said CPU socket to selectively connect a plurality of first type CPU signals to said corresponding connecting pins, and a plurality of second type CPU signals to said corresponding connecting pins according to a status of said CPU select signal.

2. The apparatus according to claim 1, wherein when said CPU socket is inserted with said first type CPU, a third equivalent resistance is measured through a second pin among said connecting pins, and when said CPU socket is inserted with said second type CPU, a fourth equivalent resistance is measured through said second pin, wherein the third equivalent resistance is not equal to the fourth equivalent resistance, and said distinguish device is coupled to said second pin to use difference between said first, second, third and said fourth equivalent resistance to determine a type of said CPU inserted in said CPU socket, and to generate a CPU select signal.

3. The apparatus according to claim 2, wherein said apparatus further receives a suspend status input signal, and said distinguish device further comprises:
   a processor select circuit, coupled to said first and said second pins to use a difference between said first, said second, said third and said fourth equivalent resistances to generate a CPU select signal; and
   an interval control circuit, to receive said suspend status input signal and delay said suspend status input signal with a predetermined stop determination time, so that said processor select circuit cuts off a connection between said first pin and said processor select circuit.

4. The apparatus according to claim 3, wherein said interval control circuit comprises:
   a first delay circuit, receiving and delaying said suspend status input signal with said predetermined stop determination time to generate a cutoff activating signal; and
   a second delay circuit, coupled to said first delay circuit to receive said cutoff activating signal and to generate a suspend status output signal after delaying a predetermined buffer time; wherein said interval control circuit enable said processor select circuit to cut off a connection between said processor select circuit and said first and second pins, and a computer system that comprises said apparatus outputs a signal to activate according to said suspend status output signal.

5. The apparatus according to claim 4, wherein said interval control circuit further comprises:
   a first resistor, with a first end coupled to a fixed voltage and a second end; and
   a latch circuit, with an input terminal, an output terminal and a control terminal, wherein said control terminal is coupled to said first delay device and said input terminal is coupled to said second end of said first resistor to receive a control of said cutoff activating signal and outputs a cutoff latch signal.

6. The apparatus according to claim 3, wherein said processor select circuit comprises:
   a first switch transistor, with a first terminal, a second terminal and a control terminal, wherein said first terminal is coupled to said first pin, said control terminal is coupled to said interval control circuit to either cutoff or conduct said connection between said first pin and said processor select circuit selects;
   a second resistor, with a first end coupled to said second terminal of said first switch transistor and a second end
   a first constant current source, coupled to said second end of said second resistor to provide a first constant current;
   a second constant current source, to provide a second constant current, wherein a difference between said first and said second constant currents is smaller than a predetermined value;
   a third resistor, with a first end and a second end coupled to said second constant current source;
   a fourth resistor, with a first end coupled to a first fixed potential and a second end coupled to said first end of said second resistor;
   a fifth resistor, with a first end coupled to said first fixed potential and a second end coupled to said first end of said third resistor, wherein said fourth resistor has a resistance different from that of said fifth resistor; and a first operation amplifier, with a first input terminal, a second input terminal and an output terminal, wherein said first input terminal is coupled to said first end of said second resistor, said second input terminal is coupled to said first end of said third resistor, and said output terminal outputs a first type signal.

7. The apparatus according to claim 6, wherein said processor select circuit comprising:
   a second switch transistor, comprising a first terminal, a second terminal and a control terminal, wherein said first terminal is coupled to said second pin, said control terminal is coupled to said interval control circuit to either cut off or conduct a connection between said second pin and said processor select circuit;
   a sixth resistor, with a first end and a second end coupled to a second fixed potential;
   a third switch transistor, comprising a first terminal, a second terminal and a control terminal, wherein said first terminal is coupled to said second pin, said second terminal is coupled to said first end of said sixth resistor, and said control terminal is coupled to said interval control circuit to cut off or conduct a connection between said second pin and said sixth resistor; and
   a second operation amplifier, comprising a first input terminal, a second input terminal and an output terminal, wherein said first input terminal is coupled to said second terminal of said second switch transistor, said second terminal is coupled to a third fixed potential, and said output terminal is coupled to a second type signal.

8. The apparatus according to claim 7, wherein said processor select circuit further comprises a logic circuit to receive said first type signal and said second type signal to generate said CPU select signal.

9. The apparatus according to claim 1, further receiving a suspend status input signal, wherein said distinguish device further comprises:
   a processor select circuit, coupled to said first pin to use a difference between said first equivalent resistance and said second equivalent resistance to generate said CPU select signal; and
   an interval control circuit, to receive and delay said suspend status input signal with a predetermined stop determination time, so that said processor select circuit cuts off a connection between said first and second pin and said processor select circuit.

10. The apparatus according to claim 9, wherein said interval control circuit comprising:
    a first delay circuit, to receive and delay said suspend status input signal with a predetermined stop determination time to generate a cutoff activating signal; and
    a second delay circuit, coupled to said first delay device to generate a suspend status output signal after receiving and delaying said cutoff activating signal with a predetermined buffer time;
    wherein said interval control circuit cuts off a connection between said first pin and said processor select circuit according to said cutoff activating signal, and a computer system comprising said apparatus is activated according to said suspend status output signal.

11. The apparatus according to claim 9, further coupled to a power regulator that provides a correct source voltage to said CPU inserted in said CPU socket according to said suspend status output signal and said CPU select signal.

12. The apparatus according to claim 9, wherein said processor select circuit comprises an activate determination control circuit that enable said processor select circuit to operate after receiving said suspend status input signal, so as to determine said type of said CPU inserted in said CPU socket.

13. The apparatus according to claim 1, wherein said distinguish device is supplied power from a prepared power supply.

14. A method for supporting multi-processors in a single motherboard, applied to a computer system that comprises a CPU socket and a suspend status input signal, wherein the CPU socket comprises a plurality of connecting pins of which a first equivalent resistance is measured through a first pin when a first type CPU is inserted in said CPU socket, and a second resistance is measured through said first pin when said CPU socket is inserted with a second type CPU, said method comprising:
  using a difference between said first equivalent resistance and said second equivalent resistance to generate a CPU select signal; and
  selectively connecting a plurality of first CPU signals to said corresponding connecting pins, and a plurality of second type CPU signals to said corresponding pins according to said CPU select signal.

15. The method according to claim 14, further comprising a step of delaying said suspend status input signal with a predetermined stop determination time after receiving, and determining which type of said CPU is inserted in said CPU socket within said predetermined stop determination time.

16. The method according to claim 14, further comprising the step of further delaying the suspend status input signal with a predetermined buffer time after the predetermined stop determination time to allow said CPU is inserted in said CPU socket operating normally.

17. The method according to claim 14, wherein a third equivalent resistance is measured through a second pin among said connecting pins when said first type CPU is inserted in said CPU, and a fourth equivalent resistance is measured through said second pin when said second type CPU is inserted in said CPU, and a difference between said third equivalent resistance and said fourth equivalent resistance is used to determined said type of said CPU inserted in said CPU socket.

* * * * *